UNITED STATES PATENT OFFICE.

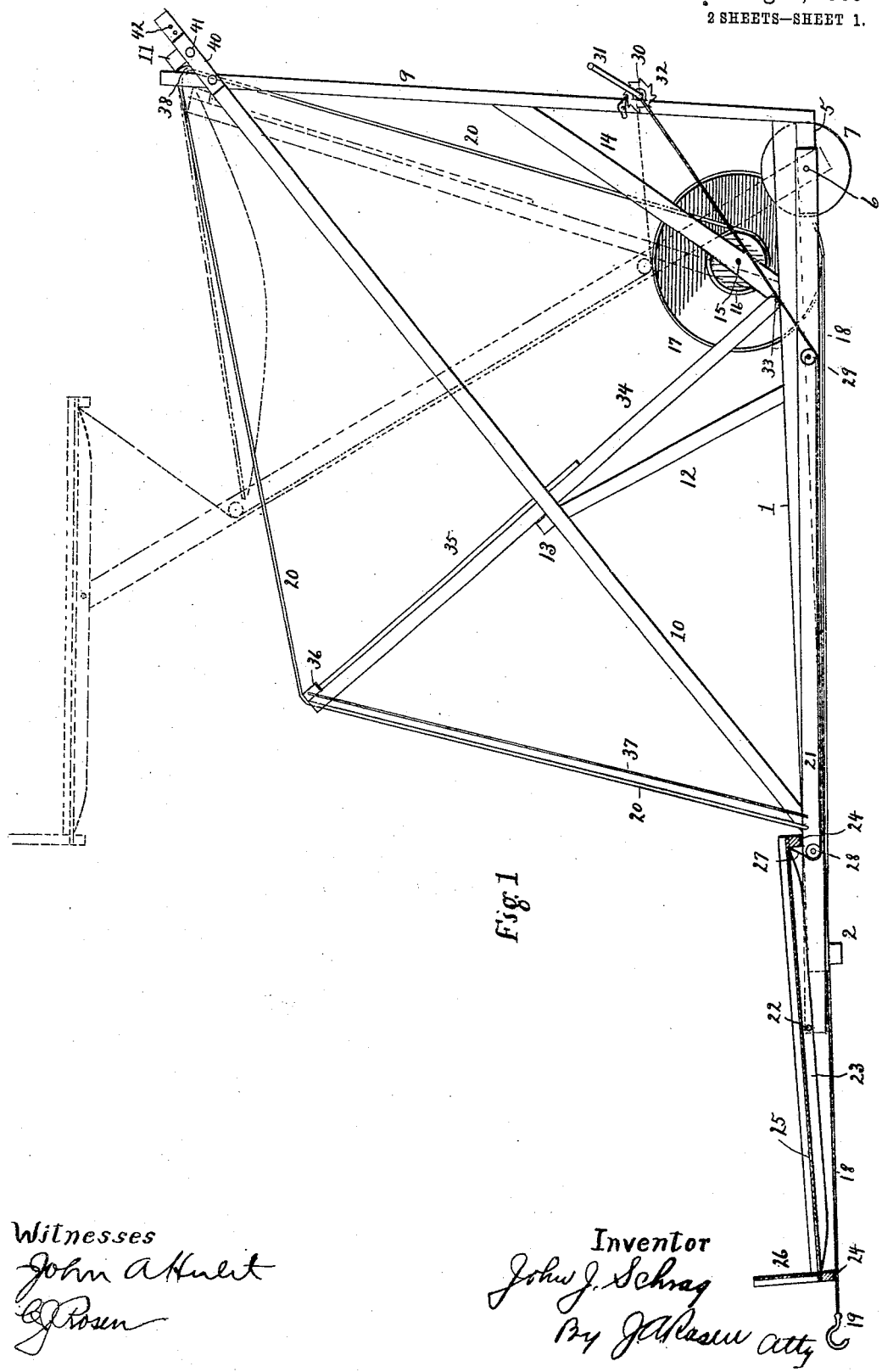

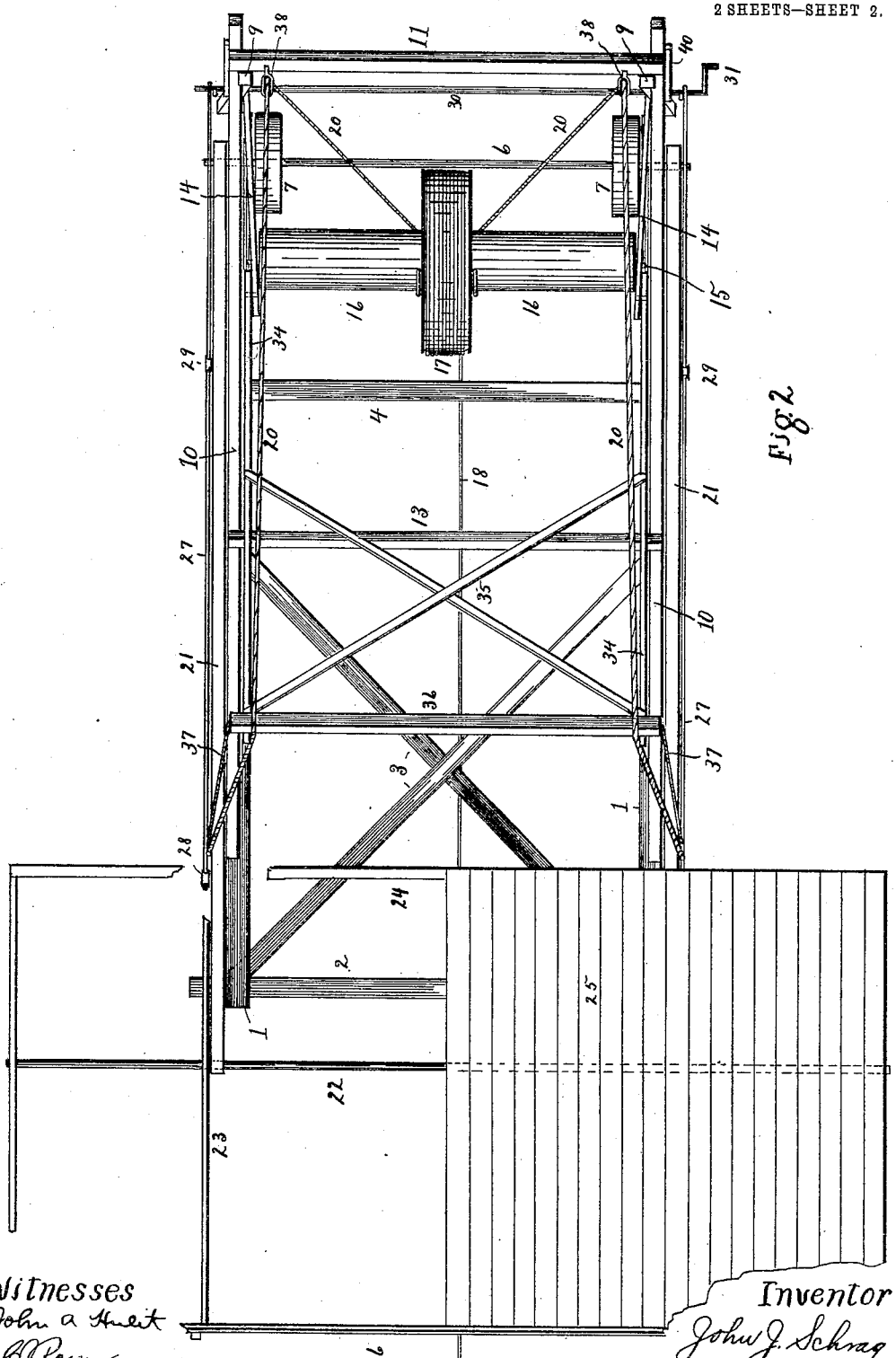

JOHN J. SCHRAG, OF MOUNDRIDGE, KANSAS.

STACKER.

No. 930,239.  Specification of Letters Patent.  Patented Aug. 3, 1909.

Application filed August 17, 1908. Serial No. 448,881.

*To all whom it may concern:*

Be it known that I, JOHN J. SCHRAG, a citizen of the United States, residing at Moundridge, in the State of Kansas, have invented a new and useful Improvement in Stackers, of which the following is a specification.

My invention is an apparatus especially adapted for stacking headed wheat and other grain in high and large stacks.

The object of my invention is to provide a stacker capable of handling headed wheat and other headed grain. And it consists of the parts, improvements, and combinations herein described and claimed.

In the drawings accompanying and forming part of this specification and in the description of the drawings, I have shown my invention in its preferred form, and have shown what I deem to be the best mode of applying the principles; but obvious changes in detail, form, proportions, and arrangement, and the transposition of parts and substitution of equivalent members, may be resorted to, within the scope of the appended claims, without departing from the spirit of the invention.

Figure 1 is a side elevation of a stacker for headed wheat, made in accordance with the principles of my invention, the carrier and other parts being shown in position with the carrier down, or on the ground, ready to receive a load; and in a dotted outline I have shown the carrier elevated to such a position that the cable-lifter has been released and the rope connecting same with the carrier support slightly relaxed. Fig. 2 is a plan view, certain parts of the floor of the carrier and of the carrier frame being removed to disclose the manner of connecting the parts thereunder.

Similar reference characters indicate like or corresponding parts throughout the two views.

I provide a suitable frame, preferably of about the shape shown in the drawings. The base consists of two long beams 1, 1, at one end of which is a cross-bar 2, while suitable braces 3, 3, 4 may also be provided to hold the beams in proper relative position. At the other end, a block 5 is fastened to the under side of each beam, and through the blocks extends a shaft or axle 6 on which are mounted the wheels 7, 7 which support that end of the apparatus, the other end resting on the ground. At the end of each beam is an upright or stud 9, forming the end of the frame, and a diagonal guide and brace 10 extends from each beam, to the corresponding stud 9, one on each side of the frame. The studs and braces are connected at the top by a cross-bar 11.

12, 12 are short braces extending between the base beams and the diagonal guides and braces 10, and 13 is a cross-bar extending thereacross.

14, 14 are additional short braces extending between the base beams and the studs and supporting a shaft 15 on which is mounted a compound power drum consisting of a large centrally disposed drum 17, and two smaller drums 16, 16 at the sides thereof. The cable 18 is wound around the large drum and is provided with a hook 19 so that the horses may be quickly hitched thereto to pull said cable and unwind it from the drum. A cable 20 is provided for each of the smaller drums to carry the load; so that it is clear that when the horses pull the cable 18, the cables 20, 20 will be wound up on the smaller drums, the power applied being increased according to the relative sizes of the drums. Arranged alongside of each side of the frame is another beam 21, which is pivoted to the axle 6 at one of its ends. In the other end of these two pivoted beams is a rod 22, on which is mounted the carrier comprising the crossbeams 23, 23, the end pieces, 24, 24, the floor 25, and the side 26. This carrier may be of any suitable size. I prefer to make it of a size sufficient to hold the capacity of the header-box which is discharged into the carrier over the side 26. The carrier is so disposed on the pivot rod 22 that the heavier weight, both when loaded and when unloaded, is in the rear, or on the left-hand (viewed in the drawings) side of the pivot, so that its natural tendency is to tilt backward. One end of a rope 27 (there being one such rope on each side of the machine) is secured to the forward end of the carrier, and from there the rope passes over the pulleys 28 and 29, which are secured to the beams 21, and to the shaft 30 which is mounted on the studs 9, 9. The other ends of the ropes are secured to this shaft as indicated in the drawings. The shaft is provided with a crank and handle 31 to wind and unwind the ropes thereon, and also with a ratchet and pawl 32 to hold the shaft from unwinding or turning backward. These two guide ropes and these pulleys are so arranged that as the carrier is raised on the beams 21, 21, the shortening of the distance between 29 and 30 will permit the rope to play out correspondingly between 28 and the carrier, the result being that the carrier will be kept in approximately level position at all points of its travel. At each side of the frame is a beam 34 pivoted on the base-beam 1 at 33. These two beams are secured together by braces 35, and at the top is a cross-bar 36. These elements constitute the cable-lifter as will be explained presently. Secured to the cross-bar 11 are two pulleys, one for each cable 20, from which the cable extends, when the carrier is down, over the cable lifter and thence down to the carrier-supporting beams 21, to which the ends of their respective cables are secured. The braces 10, 10 are so arranged as to form guides for the beams 21, 21 of the carrier-supporting frame as said carrier is lifted from lower to upper position. Stop-blocks 40, 40 are secured to the sides of the braces 10, 10 to stop the carrier, and these blocks may be adjusted by means of the bolts 41 and a series of holes 42, so that the said beams 21, 21, may have a shorter or longer travel, as may be desired. The cable-lifter frame is connected to the carrier-supporting frame by means of a couple of cords 37, 37.

To operate my apparatus, it being normally in the position shown in the drawings, and supposing the carrier to be loaded: The horses are hitched to the hook 19 and pull the cable 18, unwinding it from the drum 17, thereby winding up the cables 20, 20 on the smaller drums. Obviously a direct pull from the pulleys 38 on the carrier-supporting frame would be a very severe strain and would be impracticable for lifting a heavy load. To give more of an upward pull, the cable-lifter is provided, whereby, as indicated in the drawings, the pull on the carrier-supporting frame is upward. As the cables are thus pulled, the carrier is raised, being in a level position at all points as hereinbefore described, and the cable-lifter is carried with the cables until it strikes against the cross-bar 11, when it is slightly below the cables and out of contact therewith, and the pull on the carrier is approximately horizontal. The cords 37 then relax, and the carrier and carrier-support are drawn forward until the beams strike the blocks 40. Then, to dump the load onto the stack, the crank 31 is turned to pull down the forward end of the carrier so that the grain will run out, the forward end of the carrier coming down against the upper ends of the braces 10, 10. To return the carrier, it may be first let back to its level position by releasing the pawl and ratchet and unwinding the guide-ropes, and the carrier may be pulled back by a rope or cord fastened to the shaft 22 or by any other means. When the slack in the cords 37 is taken up, the returning carrier will also pull back the cable-lifter with the cables thereon the normal position of the cable-lifter being resting against the cross-bar 13, as indicated. To throw the contents of the carrier farther over on the stack, the blocks 40 may be set farther along on the braces 10, and by extending the ends of the blocks beyond the ends of the braces, the forward end of the discharging carrier will not come down so far and will throw the grain still farther forward.

The apparatus may be hauled or pushed about short distances on the wheels 7, 7, by applying the power at the opposite end; but for transporting longer distances, a removable wheel or wheels may be provided for that end as well.

What I claim is:

1. The combination of a main frame, a carrier-lifting frame pivoted at one end to the base of the main frame and capable of traveling between horizontal and vertical positions, a carrier pivoted to the lifting frame at its opposite end, a cable for lifting the carrier on the lifting frame, a means for maintaining the carrier in approximately level position during the lift, a stop on the main frame to stop the lifting frame in approximately vertical position, a means for tilting the carrier to discharge its contents, and a cable-lifting frame pivoted to the base of the main frame and capable of traveling between a position about midway between the extreme positions of the carrier-lifting frame and the vertical position thereof.

2. The combination of a main frame, a carrier-lifting frame pivoted at one end to the base of the main frame and capable of traveling between horizontal and vertical positions, a carrier pivoted to the lifting frame at its opposite end, a power device mounted in the main frame near the pivotal point of said lifting-frame and comprising differential drums and a cable for operating same, a pulley secured to the main frame adjacent to the position of the carrier when the lifting-frame is in vertical position, a lifting cable secured at one end to the lifting-frame adjacent to the carrier and passing over said pulley and wound upon said drum, a means for maintaining the carrier in approximately level position during the lift and for tilting the carrier to discharge its contents, a stop on the main frame for stopping the lifting frame in approximately vertical position, and a cable-lifting frame pivoted at one end to the base of the main frame adjacent to the pivotal point of the carrier-lifting frame and capable of traveling between a position where it holds the lifting cable in an approximately vertical line from the carrier-lifting frame in horizontal position to a position adjacent to said stop.

3. The combination of a main frame comprising a base and an upright section erected on the base at the forward end thereof, a carrier-lifting frame pivoted at one end to the forward end of the base and capable of traveling between horizontal and vertical positions, a carrier secured to the lifting frame at its opposite end, a pulley secured to said upright section adjacent to the carrier when the carrier-lifting frame is in vertical position, a stop on the main frame to stop the lifting-frame in approximately vertical position, a cable-lifting frame pivoted at one end to the forward end of the base adjacent to the pivot of the carrier-lifting frame and capable of traveling between a position about midway between the extreme positions of the carrier-lifting frame and the vertical position thereof, and a cable secured at one end to the carrier-lifting frame adjacent to the carrier and passing thence over the cable-lifting frame thence over said pulley and thence to the base; said parts being so arranged that the strain of the cable on the cable-lifting frame when lifting the carrier is a longitudinal compression toward the pivot without lateral strain; all substantially as set forth.

4. The combination of a main frame comprising a base and an upright section erected on the base at the forward end thereof, a carrier-lifting frame pivoted at one end to the base at its forward end and extending longitudinally with the base and capable of traveling between approximately horizontal and vertical positions, a carrier secured to the lifting frame at its opposite end, a pulley secured to said upright section adjacent to the carrier when the carrier-lifting frame is in vertical position, a stop on the main frame to stop the carrier-lifting frame in approximately vertical position, a cable-lifting frame pivoted at one end to the forward end of the base and capable of traveling between a position about midway between the extreme positions of the carrier-lifting frame and the vertical position thereof, a flexible connector between said two lifting frames of a length to permit them to be spaced apart in their said downward positions, and a cable secured at one end to the carrier-lifting frame and passing thence in an approximately vertical direction to said cable-lifting frame and frictionally over same thence over said pulley and thence to the base; said parts being so arranged that the strain of the cable on the cable-lifting frame while the carrier is being lifted is a longitudinal compression toward the pivot; substantially as set forth.

5. The combination of a main frame, a carrier-lifting frame pivoted at one end to the base of the main frame and capable of traveling between approximately horizontal and vertical positions, a carrier pivoted to the lifting frame at its opposite end, a cable for lifting the carrier on the lifting-frame, a means for maintaining the carrier in approximately level position during the lift, a stop on the main frame to stop the lifting-frame in approximately vertical position, a means for tilting the carrier to discharge its contents, an adjustable stop to stop the carrier in tilted position, and a cable-lifting frame pivoted to the base of the main frame and capable of traveling between a position about midway between the extreme positions of the carrier-lifting frame and the vertical position thereof.

6. The combination of a main frame comprising a base and an upright section erected on the base at one end thereof, a carrier-lifting frame pivoted at one end to the forward end of the base and extending longitudinally with the base and capable of traveling between approximately horizontal and vertical positions, a carrier pivoted to the lifting-frame at its other end and arranged to carry the heavier part of the load back of the pivot, a pulley secured to the main frame adjacent to the position of the carrier when the carrier-lifting frame is in vertical position, a cable-lifting frame pivoted to the main frame at the forward end of the base and capable of traveling between a position about midway between the extreme positions of the carrier-lifting frame and the vertical position thereof and capable of supporting a cable in approximately vertical position from the carrier-lifting frame, said cable secured to said carrier-lifting frame and passing thence over said cable-lifting frame and over said pulley, pulleys mounted on said carrier-lifting frame, and cables secured to the carrier forward of the pivot and passing thence over said last-named pulleys and adjustably secured to the forward end of the frame.

In testimony whereof I have hereunto signed my name in the presence of witnesses.

JOHN J. SCHRAG.

Witnesses:
C. J. ROSEN,
HAZEL D. RICHARDSON.